Feb. 12, 1924.    1,483,448
E. JAEGER
INDICATING DEVICE FOR AVERAGE SPEEDS
Filed June 12, 1920    2 Sheets-Sheet 1

Inventor
Edmund Jaeger by H. R. Kerslake
Attys

Feb. 12, 1924.

E. JAEGER 1,483,448

INDICATING DEVICE FOR AVERAGE SPEEDS

Filed June 12, 1920  2 Sheets-Sheet 2

Inventor
Edmund Jaeger by H. R. Kerslake
Attys

Patented Feb. 12, 1924.

1,483,448

UNITED STATES PATENT OFFICE.

EDMOND JAEGER, OF PARIS, FRANCE.

INDICATING DEVICE FOR AVERAGE SPEEDS.

Application filed June 12, 1920. Serial No. 388,700.

*To all whom it may concern:*

Be it known that I, EDMOND JAEGER, a citizen of the French Republic, residing at Paris, France, 33 Rue du Louvre, have invented certain new and useful Improvements in Indicating Devices for Average Speeds, of which the following is a specification.

This invention relates to an indicating device by which the simple observation of a dial provided with two pointers will give the mileage, the time elapsed since the start of the vehicle and the average speed per hour.

The speed thus indicated may be the average running speed, i. e., the average speed inclusive of stops, or the average net speed, i. e., the speed with stops deducted, or these two mean speeds at the same time, and in the latter case a third pointer is added, this being mounted on a shaft concentric to the shaft of the time pointer; the average speed will be read at the intersection of the pointers.

The following description together with the accompanying drawings which are given by way of example sets forth the special characteristics and the advantages of this device.

Figure 1:
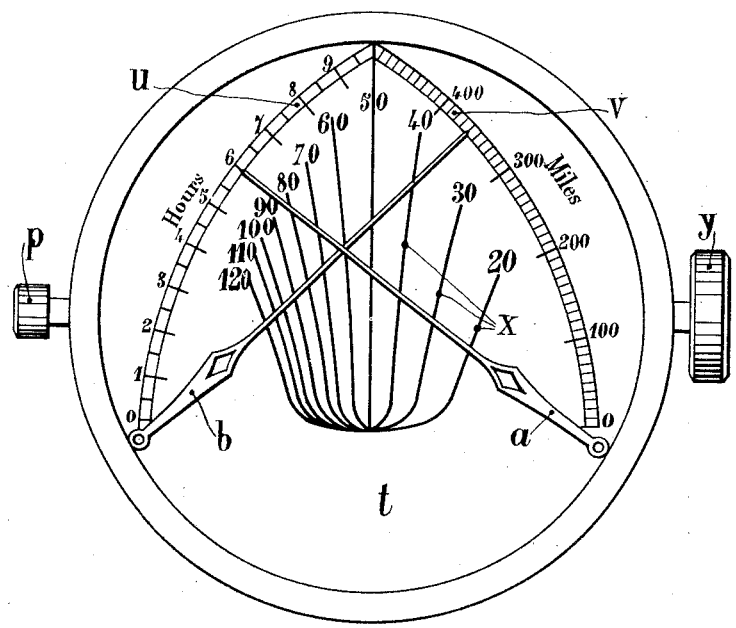
Fig. 1 is a front view of the indicating device.
Figure 2:
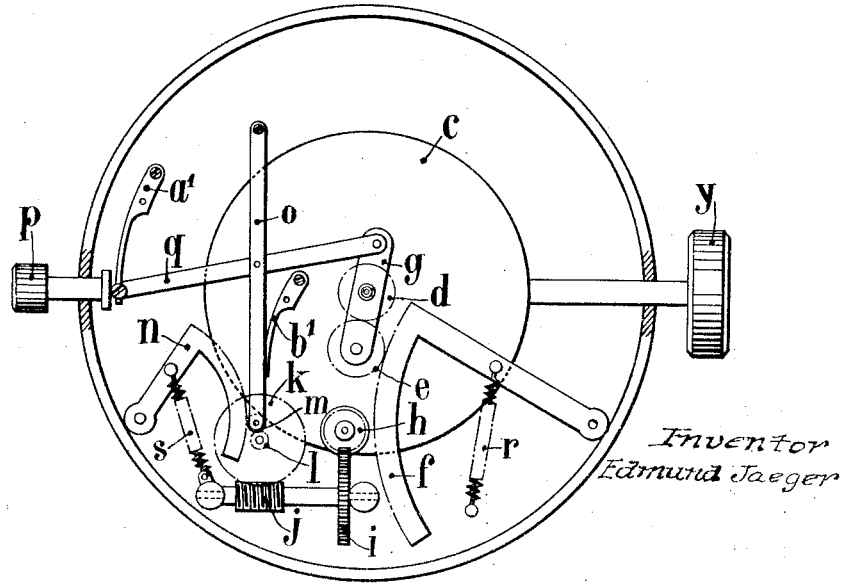
Fig. 2 shows the device with the dial and the top plate removed.
Figure 3:
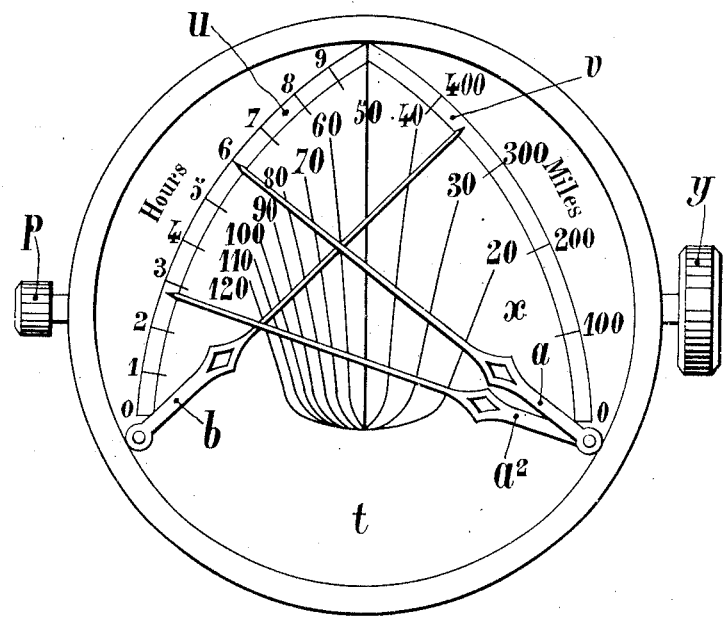
Fig. 3 shows the same apparatus, provided with two time needles, simultaneously indicating the average speed, stops included and stops deducted.
Figure 4:
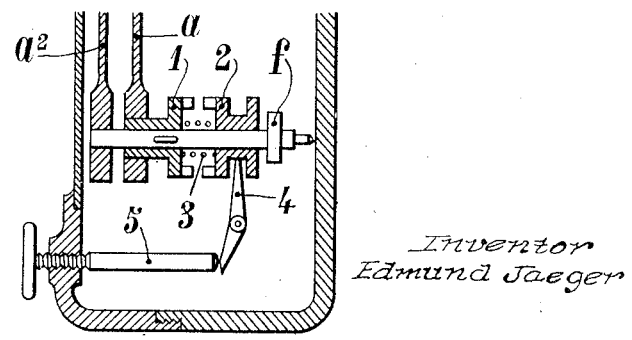
Fig. 4 shows the clutch device for the same purpose serving to show the average speed, stops deducted.

The indicator according to this invention comprises essentially two pointers $a$, $b$, the pointer $a$ showing the time and the pointer $b$ the mileage. The pointer $a$ is actuated by a watch movement of any suitable description $c$, through the medium of the pinions $d$ and $e$, and the toothed sector $f$. The pinion $e$ is mounted on a swinging arm $g$, whose use will be further set forth. The jointer $b$, indicating the mileage, is actuated by means of a flexible transmission device after the manner of the usual speed indicators, through the medium of a suitable speed reduction device consisting of the worm $h$, the worm wheel $i$, the worm $j$, the worm wheel $k$, the pinions $l$ and $m$, and the toothed sector $n$ having mounted on the shaft thereof the pointer $l$. The pinion $m$ is also mounted on the end of a swinging arm $o$. As shown in Fig. 1, the dial $t$ contains two graduated scales $u$, $v$, the scale $u$ being employed for the time and the scale $v$ for the mileage, while the central part of the dial is provided with the set of curves $x$ numbered 20, 30, 40, etc., to 120 and indicating the average speeds.

The average speed of the vehicle is read at the intersection of the two pointers; for example in the instance here set forth, the time pointer indicates 6 and the mileage (or kilometer) pointer 360, making 360 kilometers in 6 hours. The two pointers are observed to cross upon the curve which is designated by the number 60, and consequently the average speed is shown at 60 kilometers per hour.

To bring the device back to the zero point, all that is required is to press upon the button $p$ which acts upon the lever $q$ and thus effects the movement of the swinging arms $g$ and $o$, whereby the pinions $l$ and $m$ are disengaged from the sectors $f$ and $n$. The return movement of these sectors is produced by the coiled springs $r$ and $s$, and the pointers are thus brought back to the zero position. When the button $p$ is released, the springs $a^1$ and $b^1$ drive forward the level $q$ and the arms $o$ and $g$, whereby the said pinions are now engaged. At $y$ is the milled head for winding the watch.

The device herein described indicates the mean running speed, but it could also be employed to show the mean net speed, and for this latter purpose it is only required to hold the time pointer in a fixed position at each stop by any suitable means; these two devices can also be combined in a single indicator, with the addition of a third pointer mounted on a shaft concentric to the shaft of the time pointer.

The third needle $a^2$ is mounted on the same axis 7 as the needle $a$. This is integral with a gripper sleeve 1, loose on said shaft, and held away from a second gripper sleeve 2, sliding on said shaft, but carried therewith during its rotation by means of the key 6. The clutch is controlled by the screw 5 acting on the lever 4, so as to cause the engagement of the sleeves 1 and 2 or to release them on starting and stopping.

In Fig. 14 the sleeves 1 and 2 are shown disengaged, that is to say that the vehicle is stopped and the needle $a^2$ held fast, the needle $a$ continuing to turn. When the vehicle is again set in operation screw 5 is actuated so as to push the lever 4 in the direction of the arrow 8, which causes the engagement (clutch action) of the sleeves 1 and 2, and hence causes the rotation of the needle $a^2$. When another stop is made the screw is actuated so as to move it in a direction opposite the arrow 8; the spring 3 then causes the release and stoppage of the needle $a^2$.

It is seen that the point of intersection of the needles $a$ and $b$ gives on the range finder the value of the average speed including stoppages and the point of intersection of the needles $a^2$ and $b$ on the range finder the value of the average speed exclusive of stoppages.

The watch movement can be disposed in such manner as to be wound directly by the action of the flexible transmission member, thus suppressing the winding device $y$.

Having thus described the nature of my said invention and the best means I know of carrying the same into practical effect, I claim:

1. In an indicating apparatus comprising two needles each rotating about a different axis and arranged to cross on a graphic chart, means to set one of the needles in rotation proportionally to the time, means to actuate the other needle proportionally to the distance traversed, means to interrupt the movement of the time indicating needle during the stoppages of the distance indicating needle, the arrangement of the needles being such that the point of intersection of the needles indicates thereon a value proportional to the ratio between the angular displacements of the two needles for the purpose of obtaining an indicator of average speed stops excluded.

2. In an indicating apparatus comprising two needles each rotating about a different axis and arranged so as to cross on a graphic chart, a shaft on which one of the needles is idly mounted, means to set said shaft in rotation proportional to the time, means to connect and disconnect said needle and said shaft, means to actuate the other needle in proportion to the distances traversed, the arrangement of the needles being such that the point of intersection of the needles indicates on the range finder a value proportional to the ratio between the angular movement of the two needles, for the purpose of obtaining an indicator of average speed exclusive of stops.

3. In an indicating apparatus comprising two needles each rotating about a different axis and arranged so as to cross on a graphic chart, a shaft on which one of the needles is loosely mounted, means to set said shaft in rotation in proportion to the time, a grip sleeve integral with the needle, a grip sleeve carried in rotation by said shaft but adapted to slide thereon, a pivoted lever adapted to act on said sleeve, a spring separating the two sleeves, a screw adapted to bear on said lever, means to actuate the other needle proportionally to the distances traversed, the needles being arranged on the range finder so that the point of intersection of the needles indicates thereon a value proportional to the ratio between the angular displacements of the two needles for the purpose of obtaining an indicator of average speed exclusive of stops.

4. In an indicating apparatus comprising two needles each rotating about a different axis and arranged so as to intersect on a graphic chart, means to set one of these needles in rotation in proportion to the distance traversed, a shaft on which the other needle is fixed, a third needle mounted loosely on said shaft, means to set said shaft in rotation proportionally to the time, a grip sleeve integral with the loosely mounted needle, a grip sleeve set in rotation by said shaft but adapted to slide thereon, a pivoted lever adapted to act on said sleeve, a spring separating the two sleeves, a screw adapted to bear on said lever, the arrangement of the needles on the range finder being such that the points of intersection of the needles indicate thereon values proportional to the ratio of their angular displacements for the purpose of obtaining an indicator of average speed including and exclusive of stops.

In testimony whereof I have signed name to this specification.

EDMOND JAEGER.